United States Patent [19]

Vrieze

[11] Patent Number: 5,002,421
[45] Date of Patent: Mar. 26, 1991

[54] CONNECTION FOR SUCCESSIVE SECTIONS OF A HELICAL SPRING LIKE CONVEYING ELEMENTS

[75] Inventor: Luc Noël de Vrieze, St. Jan in Eremo, Belgium

[73] Assignee: Elite N.V., Maldegem, Belgium

[21] Appl. No.: 903,210

[22] Filed: Sep. 2, 1986

[30] Foreign Application Priority Data

Sep. 2, 1985 [NL] Netherlands .................. 8502397

[51] Int. Cl.$^5$ ................................................ F16B 7/18
[52] U.S. Cl. ................................ 403/292; 403/300; 403/362; 198/666
[58] Field of Search ............... 403/292, 306, 307, 314, 403/43, 46, 214, 229, 362, 300, 375, 373, 296, 343, 297; 198/660, 666, 676, 677

[56] References Cited

U.S. PATENT DOCUMENTS

| | | | |
|---|---|---|---|
| 983,070 | 1/1911 | Lindner | 403/314 |
| 2,234,504 | 3/1941 | Robinson et al. | 403/300 |
| 2,292,934 | 8/1942 | Fitch | 198/666 |
| 2,297,167 | 9/1942 | Robinson et al. | 403/300 |
| 3,133,625 | 5/1964 | Best | 198/666 X |
| 3,178,210 | 4/1965 | Dickinson | 403/292 |
| 3,753,583 | 8/1973 | Offenbroich | 403/297 |
| 4,068,346 | 1/1978 | Binder | 403/300 |

*Primary Examiner*—Peter M. Cuomo
*Attorney, Agent, or Firm*—Richard Buxhnell

[57] ABSTRACT

A helical spring coupling for coupling together two helical spring ends, particularly two ends of a carrier in the form of a helical spring in a conveyor, comprises a coupler which is in engagement with both helical spring end portions. Over a certain distance the turns of the two helical spring end portions are turned coaxially into one another and lie one against the other in the axial direction. The turns fit into a helical groove formed in the coupler and whose pitch coincides with the pitch of the turns.

The coupler may consist of an elongate core part having a helical rib provided on its outer peripheral surface, the groove being formed in the outer side of the rib. The two helical spring end portions may be fixed by one or more threaded bolts extending transversely through the coupler and pressing against the turns of the helical spring end portions in the groove.

3 Claims, 1 Drawing Sheet

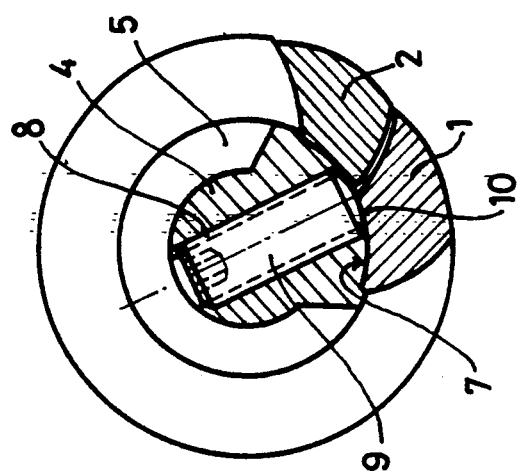
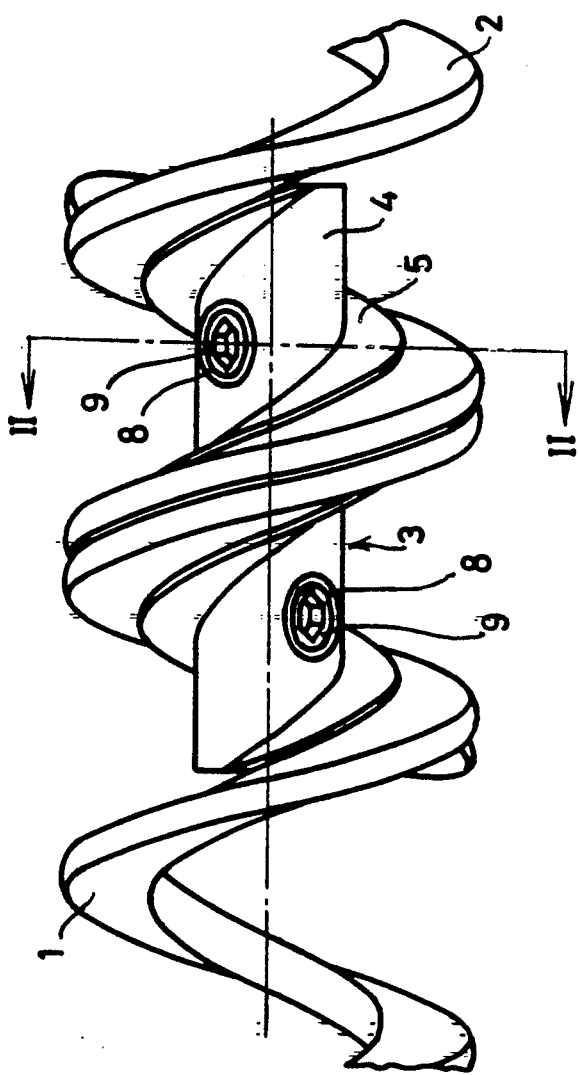
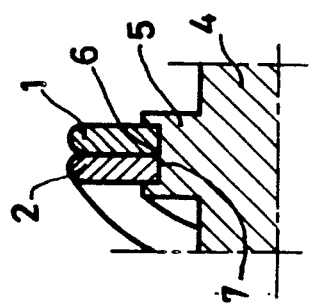

CONNECTION FOR SUCCESSIVE SECTIONS OF A HELICAL SPRING LIKE CONVEYING ELEMENTS

BACKGROUND OF THE INVENTION

The invention relates to a helical spring coupling for coupling together two helical spring ends, particularly two ends of a carrier in the form of a helical spring in a conveyor, comprising a coupler which is in engagement with both helical spring end portions.

A coupling of this type is known from U.S. Pat. specification No. 3,003,464.

In this known helical spring coupling the helical spring end portions which are to be coupled together are attached to a coupler which is in the form of a cylindrical pin and which fits into said end portions, while the ends of the helical spring end portions lie one against the other. The pin is provided with radially projecting bosses, which are screwed in between the turns of the helical spring end portions and engage therewith, thus fastening said end portions in the axial direction.

This known coupling has the shortcoming that the forces which have to be transmitted from one spring end portion to the other must be transmitted entirely through the coupler, and in particular through the bosses, so that the coupler must meet stringent requirements. Moreover, the coupling can become detached fairly easily because of the manner in which the helical spring ends are attached to the coupler.

SUMMARY OF THE INVENTION

It is the aim of the invention to overcome the shortcomings of the known coupling. According to the invention this aim is achieved with a helical spring coupling of the type defined above, which is characterized in that over a certain distance the turns of the two helical spring end portions are turned coaxially into one another and lie one against the other in the axial direction, the turns which are turned one into the other and lie one against the other fitting into a helical groove which is formed in the coupler and the pitch of which coincides with the pitch of the helical spring end portions.

With this coupling it is ensured that practically no forces act on the coupler, because the turns of the helical spring end portions lie one against the other, so that the forces are transmitted directly from one helical spring end portions to the other. Moreover, the turns of the helical spring end portions can be received in the groove in such a manner as to be clamped therein to some extent, so that the likelihood of the detachment of the coupling is reduced to a minimum. In addition, the coupling is easily fitted.

The coupler is preferably disposed inside the helical spring end portions and the helical groove provided on the outside of the coupler, so that the coupling has no parts projecting beyond the outer periphery of the helical spring end portions, which is important when the coupling joins together two end portions of a carrier in the form of a helical spring in a conveyor which has to be moved through a tube.

In one practical embodiment the coupler consists of an elongate core part having a helical rib provided on its outer peripheral surface, the groove being formed in the outer side of the rib, while the diameter of the preferably cylindrical care part is preferably smaller than the diameter of the bottom of the helical groove. When used for a coupling in a carrier in the form of a helical spring in a conveyor, the core of the coupler thus remains clear of the teeth of a gear driving the carrier in the axial direction.

For the purpose of fastening the turns in the groove, at least one hole extending in the transverse direction through the coupler is provided in the latter, this hole leading out at one end into the bottom of the groove and being provided with an internal screwthread, into which is screwed a threaded bolt which at the bottom of the groove presses against the turns of the helical spring end portions lying in the groove.

The invention also relates to a coupler for a helical spring coupling according to the invention.

The invention will now be explained by the following description of one example of its embodiment and with reference to the drawings.

BRIEF DESCRIPTION OF THE DRAWINGS

FIG. 1 is a side view of a preferred embodiment of a helical spring coupling according to the invention.

FIG. 2 a cross-section of the helical spring coupling on II—II in FIG. 1, and

FIG. 3 is a section of a part of the coupling on the line III—III FIG. 1.

DESCRIPTION OF A PREFERRED EMBODIMENT

FIG. 1 shows a helical spring coupling for coupling together two helical spring end portions 1 and 2. The turns of these helical spring end portions 1 and 2 are, over a determined distance, turned coaxially one into the other and lie against one another in the axial direction. The turns which are turned into one another are held in place by the coupler 3, which is disposed inside these turns, owing to the fact that said turns are fittingly received in a helical groove 6 which is formed in the coupler 3 and whose pitch coincides with the pitch of the turns.

In the example of embodiment illustrated the coupler consists of an elongate cylindrical core part 4 provided with a helical rib 5 which is formed on the outer peripheral surface of said core part and the pitch of which coincides with that of the turns. The groove 6, in which are received the turns which are turned one into the other, is formed on the outside of the ribs 5. The diameter of the core part 4 is smaller than the diameter of the bottom 7 of the groove 6. In the example of embodiment illustrated the width of the groove is approximately twice the axial width of the turns of the helical spring end portions, which in this case have a substantially rectangular section.

In the coupler 3 two holes 8 are formed, which extend transversely through it and which at one end lead out into the bottom 7 of the groove 6 and are provided with an internal screwthread (FIG. 2). Into each of the two holes a threaded bolt 9, for example a set bolt, is screwed, its end 10 pressing against the inner side of the two turns lying in the groove. The holes 8 are so disposed that their mouths lie approximately in the middle of the groove 6, so that the bolts 9 act approximately centrally between the turns.

The embodiment of the helical screw coupling according to the invention which is shown in the drawings is particularly suitable for coupling together two end portions of a carrier in the form of a helical spring in a conveyor. A conveyor of this type is described for example in Dutch Patent Application No. 81 01186 or European Patent Application No. 82 200 302 (publication No. 0 060 009). The carrier in the form of a helical spring is frequently propelled in the axial direction by means of a gear whose teeth mesh with the turns of the carrier. Because of the relatively small diameter of the core part 4, the tips of the teeth of the gear do not come into contact with the core part.

Since the turns of the helical spring end portions lie one against the other, the forces which have to be transmitted from one helical spring end portion to the other are transmitted by the turns themselves and not via the coupler 3. The coupler 3 can therefore be made of a relatively inexpensive material, such as plastics material, for example. A coupler of plastics material also has the advantage of being flexible to a certain extent.

The fitting of the coupling is very simple. The coupler 3 is first screwed into one of the helical spring end portions, in such a manner that the turns of the helical spring end portion lie on one side of the groove 6. The other helical spring end portion is then screwed on to the coupler 3, the turns being pushed into the remaining space in the groove 6 Finally, the threaded bolts 9 are inserted and screwed tight, so that the different components are secured in relation to one another.

It will be clear that the invention is not restricted to the embodiment given as an example. Thus, the turns of the helical spring end portions may have, instead of a substantially rectangular section, a circular section or a section of a different shape. The shape of the groove will then preferably be adapted to that shape.

The diameter of the core part may also be larger of smaller in relation to the diameter of the bottom of the groove. It is possible to use a coupler consisting of a cylindrical body in which a helical groove is formed in its periphery.

For certain applications it may even be desired for the coupler to be in the form of a cylindrical bush with the helical groove formed in the inside of the bush. A bush of this kind is then attached on the outer side of the windings which have been turned one into the other.

What is claimed is:

1. A hollow helical spring coupling for coupling together two hollow helical spring ends, particularly two ends of a carrier in the form of a hollow helical spring in a conveyor, comprising an elongate coupler which is in engagement with both hollow helical spring ends, and wherein over a certain distance said hollow helical spring ends are turned coaxially into one another and lie one against the other in abutting relationship in the axial direction within a helical groove formed on said coupler, said groove having a pitch which coincides with the pitch of said hollow helical spring ends, said pitch providing an open passageway between circumferentially related points along the abutting portions of said helical spring ends, wherein at least one hole extending in the transverse direction through the coupler is provided in the latter, said hole leading out at one end into said helical groove and being provided with an internal screw thread, into which is screwed a threaded bolt which at the bottom of said helical groove exerts an outward radial force against said hollow helical spring ends.

2. The hollow helical spring coupling of claim 1, wherein two threaded holes are formed in the coupler, their centre lines, viewed in the axial direction of the coupler, extending at an angle to one another.

3. A coupler for a hollow helical spring coupling for coupling together two hollow helical spring ends, particularly two ends of a carrier in the form of a hollow helical spring in a conveyor, said coupler being provided with a helical groove to receive fittingly said hollow helical spring ends when the latter have been turned coaxially into one another and lie one against the other in the axial direction, wherein the coupler has at least two threaded holes extending in the transverse direction of the coupler, whose centre lines, viewed in the axial direction of the coupler, are at an angle in relation to one another and wherein the holes lead out at one end into the bottom of said helical groove.

* * * * *